Sept. 6, 1927.
G. T. STRITE
CULTIVATING MEANS
Filed Oct. 17, 1921
1,641,207
3 Sheets-Sheet 1
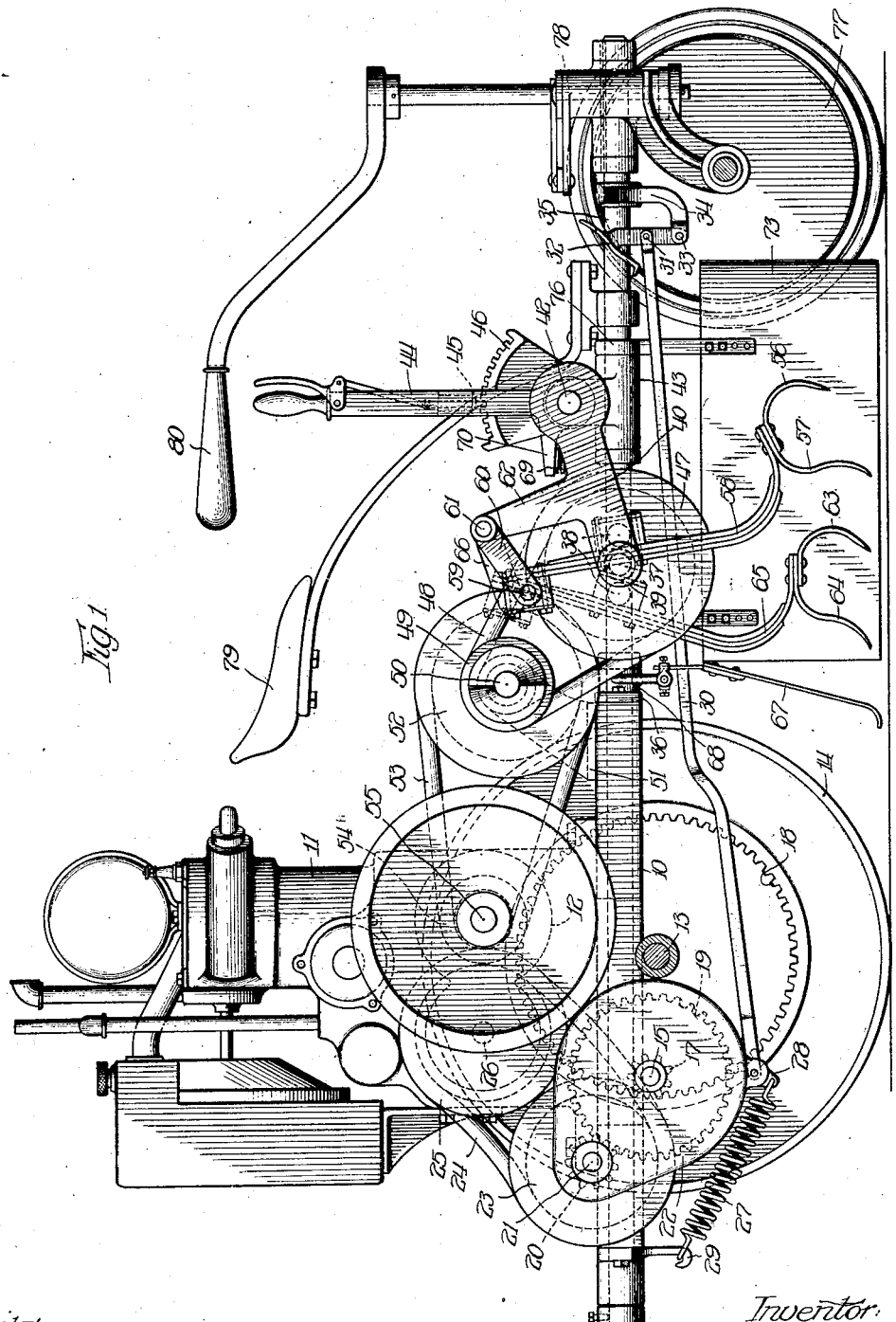
Witness:
A. Burkhardt
Inventor:
George T. Strite,
By Wilkinson, Huxley, Byron & Knight
Attys

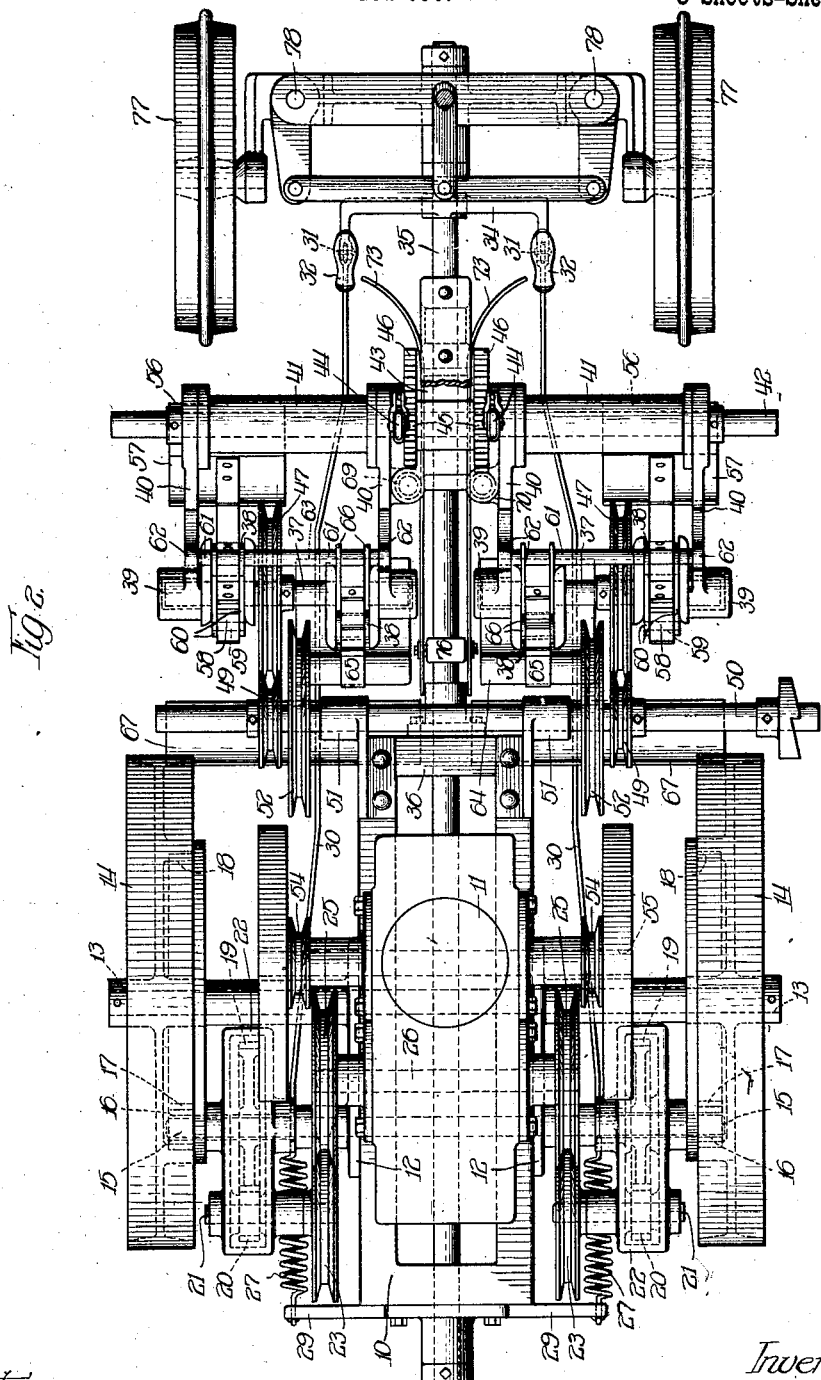

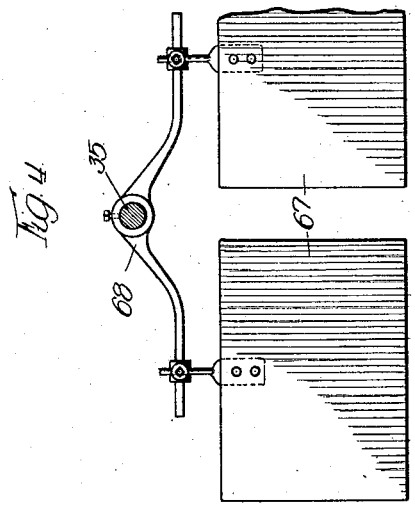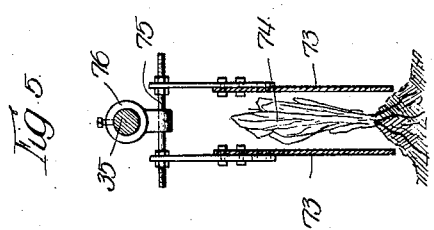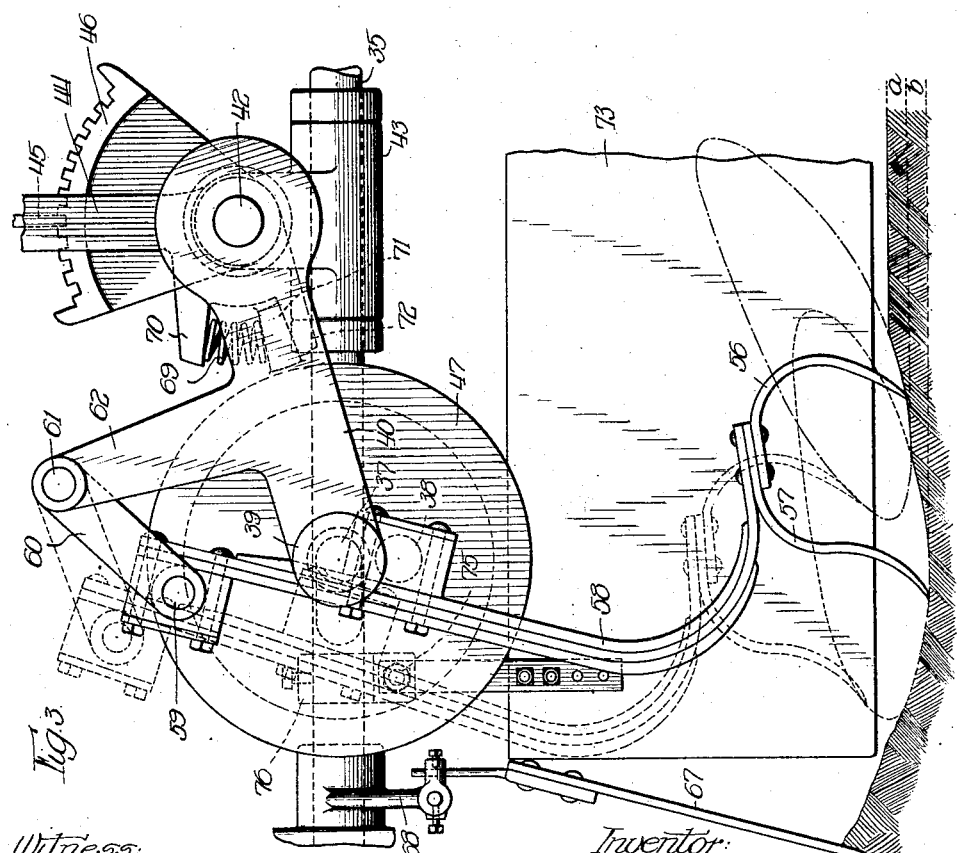

Patented Sept. 6, 1927.

1,641,207

UNITED STATES PATENT OFFICE.

GEORGE T. STRITE, OF MINNEAPOLIS, MINNESOTA, ASSIGNOR OF ONE-THIRD TO HARRY W. BOLENS, OF PORT WASHINGTON, WISCONSIN, AND ONE-THIRD TO PAUL D. DURANT, OF MILWAUKEE, WISCONSIN.

CULTIVATING MEANS.

Application filed October 17, 1921. Serial No. 508,293.

This invention relates to cultivating means.

The purpose of all ground cultivating, after the plants have started to grow, is to destroy obnoxious weeds, to break the crust that forms over the surface of the ground after a rain, and to pulverize the surface of the ground to form a fine dry mulch which prevents obnoxious weeds from starting and which absorbs and quickly passes moisture to the underlying plant roots, retaining the moisture there, and which prevents a crust from forming over the surface of the ground until after another rain.

Most, if not all, of the propelled cultivators in use today do not properly treat the ground, nor do they destroy weeds to any great extent without harming the cultivated plants, the ground around which is being worked. For example, a cultivator shovel drawn through the ground moves the earth and weeds slightly forward and to one side, leaving a furrow. The furrow may be covered by the operation of a second adjacent shovel, but the last shovel will always leave a furrow whereby moisture may be drawn therefrom. The ground is left uneven, large chunks of earth are thrown or tumbled over the surface, and if the ground is not pulverized or mulched as it should be, the shovels will go too deep and turn up the moist soil, and weeds will begin to grow again. Such shovels bury more weeds than they destroy, or simply transplant the weeds from one position to another without destroying same.

One object of the present invention is to provide simple, efficient and durable means for properly treating or mulching soil, particularly around plants undergoing cultivation, without harming such plants and at the same time destroying weeds.

Another object is to provide a power driven hoe which effectively mulches soil and which reduces the required propelling power to a minimum.

Another object is to provide a cultivator adapted to meet the various requirements for successful commercial use.

These and other objects are accomplished by means of the arrangements disclosed on the accompanying sheets of drawings, in which—

Figure 1 is a side elevation of a tractor cultivator embodying my invention;

Figure 2 is a top plan view of the same arrangement;

Figure 3 is a fragmentary side elevation, on an enlarged scale, showing the ground working tools, actuating mechanism therefor and some associated parts;

Figure 4 is a detail front elevational view of the guard against which the soil is thrown; and Figure 5 is a sectional view through the guards between which the plants are received during the cultivating operation.

The various novel features of my invention will be apparent from the following description and drawings and will be particularly pointed out in the appended claims.

Referring to the figures of the drawings it will be noted that I have disclosed my invention in connection with a tractor embodying ground working tools which are actuated by the motor which propels the tractor. It will be understood, of course, that the ground working tools may be operated from any suitable source. The frame of the tractor includes a yoke 10, upon which engine 11 is mounted. Secured to opposite sides of the yoke 10 are castings 12 which form bearings for the axle 13, upon opposite ends of which the traction wheels 14 are mounted, and for the bull pinion shaft 15. Mounted loosely upon each end of the bull pinion shaft 15 for rotation thereon is a sleeve 16 to the outer portion of each of which is secured a pinion 17 meshing with an internal gear 18 formed integrally with or secured to the associated traction wheels 14 for transmitting propelling power thereto. Keyed to the opposite end of each of said sleeves 16 is a gear 19 which meshes with and is driven by a gear 20 mounted upon a shaft 21 having bearings in an oil-tight casing 22. Secured to an extending end of each of these shafts 21 is a sheave 23 around each of which an associated belt 24 passes, the latter in each case also passing around an associated sheave 25, one mounted at each end of the engine cam shaft 26 whereby the parts connected thereto are driven at one-half of the motor speed. Each of the oil-tight casings 22 containing gears 19 and 20, is rockably mounted about the shaft 15 as a center and accordingly, when either or both of the casings 22 are rocked in one direction or the other, the associated shafts 21, gears 20 and sheaves 23 are rocked in the same sense. Normally the casings 22 and the other parts mentioned in connection therewith are yieldably held in an upward position, wherein the connecting belts 24 loosely engage the sheaves 23 and 25, as a result of the action of springs 27, one end of each of which is connected to a projection 28 at the underside of each casing 22 and the opposite end of each of which springs is secured to a finger 29 depending from frame 10 of the tractor.

In Figure 1 of the drawings, the belt 24 is shown loose or in a non-driving relation with respect to the sheaves 23 and 25. However, if it is desired to transmit power from the engine 11 to the traction wheels 14 the same may be done by rotating the casings 22 in a counterclockwise direction, as viewed in Figure 1. For controlling this movement there is secured to the lower end of each of the casings 22 one end of a connecting rod 30, the opposite end of each of which is pivotally connected at 31 to an intermediate part of an associated foot control lever 32, the lower end of each of which is pivotally connected at 33 to a bracket 34 secured to a central frame member 35 extending forwardly from and secured to a member 36 of the main frame 10. It is apparent, therefore, that if it is desired to propel the tractor forwardly in a straight line both foot control levers 32 will be thrust forwardly, and if it is desired to turn the tractor through the operation of the traction wheels 14, this may be accomplished by thrusting forwardly only one or the other of said foot control levers 32 for steering the tractor to the right or to the left. When the sheaves 23 are pulled upwardly and forwardly by the springs 27 the periphery of each of the sheaves strikes a fiber block which automatically acts as a brake on the traction wheel 14 for facilitating short turning of the tractor.

The ground working tools illustrated in the drawings are hoes and they are actuated in pairs through two separate crank shafts 37, each crank shaft in this particular instance having two crank portions 38. Each crank shaft 37 is journaled in bearing portions 39 formed in the outer ends of arms 40, which, in turn form portions of a yoke 41 pivotally mounted upon a transversely extending supporting shaft 42, which in turn is supported by a bracket 43 secured to the central frame member 35. The yoke 41 is provided with a hand control lever 44 by means of which the yoke and, accordingly, the rotary hoes to be referred to in detail hereinafter, may be raised and lowered, said control lever having a hand controlled detent 45 cooperating with a stationary segment 46 whereby the yoke and hoes may be supported in different positions or at different heights.

Secured to each crank shaft 37 is a sheave 47 around which an associated belt 48 passes, said belt also passing around a sheave 49 secured to a transversely extending shaft 50 supported in bearing members 51. Also secured to the shaft 50 are a plurality of sheaves 52 around which pass associated belts 53, which in turn pass around sheaves 54 secured to the crank shaft 55 of the engine 11. The arrangement at each side of the tractor is the same and the hoes at each side are independently driven with respect to the hoes at the other side.

From the arrangement shown in Figure 1 of the drawings it will be appreciated that if the control levers 44 are moved forwardly a predetermined amount from the position shown the sheaves 47 will be raised, causing the belt 48 to become loose with respect thereto, whereupon the hoes will cease to be actuated. Upon returning the control levers 44 to the position shown in Figure 1, with the engine in operation, the hoes again will be rotated.

As mentioned generally hereinabove, there are two sets of hoes on each side of the tractor, one set including a forward hoe 56 and a rear hoe 57, both of which are secured to a spring arm 58, an intermediate portion of which is operatively connected to one crank 38 and the upper end of which is operatively connected at 59 to one end of a pair of links 60, the opposite ends of which links are loosely mounted on a shaft 61 carried in the upper ends of a pair of arms 62 formed integrally with the arms 40. Likewise the second set of hoes on the same side of the tractor includes a forward hoe 63 and a rear hoe 64 secured to a spring arm 65, an intermediate portion of which is operatively connected to the other crank 38 and the upper end of which is likewise connected to a second pair of links 66 loosely mounted on the shaft 61. Accordingly, under operating conditions, it will be seen that the portions of the hoe-supporting arms 58 and 65 connected to the cranks 38 will take a circular path, while the upper ends of said supporting arms 58 and 65 connected to the pairs of links 60 and 66 will move in the arc of a circle with the shaft 61 as a center. As a result thereof, the hoes which are mounted at the ends of the lower or longer portions of the supporting arms 58 and 65, will be given a relatively long stroke movement in taking elliptical paths, as indicated by the dotted lines in Figure 3 of the drawings.

It will be noted that the forward hoes 56 and 63 in each set have their cutting edges located above the cutting edges of the associated rear hoes 57 and 64 in each case, so that the total depth of ground to be treated or mulched by the hoes will be in two stages, the forward hoe in each case cutting into the ground one-half of the total depth and the rear hoe cutting into the ground the remaining one-half of the total depth. While both hoes are working simultaneously, the front and rear hoes cut over a particular spot in succession.

Referring particularly to Figure 3 of the drawings, it will be noted that when the forward hoe 56 digs into the ground a distance indicated by the letter *a*, which is one-half of the total depth that the ground is mulched, the hoe 57 is giving the second stage treatment by digging into the ground a distance indicated by the letter *b*, so that the total depth of ground indicated by *a* and *b* is mulched in two stages. The ground which is sliced or scooped into by the rotary hoe 56 together with any weeds which are in the path of said hoe 56, accordingly are cut and thrown rearwardly against the hoe 57 with considerable force, thereby assisting in pulverizing the soil and shaking any earth which may have adhered to the roots of weeds disturbed by the hoe 56. The hoe 57 then in turn on its next cutting stroke, in addition to slicing and chopping through the soil thus partially mulched and further disturbing the weeds already acted upon by the hoe 56, cuts down into the ground an additional amount, taking the earth and weeds and roots of weeds in its path, and throwing the same forcibly against one of the two guards 67 for completing the mulching action of the earth and breaking away from the weeds what earth has up to this time clung to the roots thereof. In addition to the ground being well mulched, the weeds are positively destroyed. The lower end of each of the guards 67 is curved rearwardly and smooths off or levels the mulched ground, leaving it at a slightly higher level than it occupied before treatment by the hoes. The guard members 67 are adjustably secured to a bracket 68 which in turn is secured to the central frame member 35. The cutting stroke of each of the hoes is a downward and rearward digging and slicing cut behind which there is relatively great force due to the high speed at which the hoes entered the ground. The speed with which the hoes enter the ground is greater than the speed with which the hoes leave the ground, due to the paths of movement of the hoes as indicated in Figure 3 of the drawings.

If the hoes strike a rock or other nonyieldable substance, not only will the spring supporting arms 58 and 65 yield, but also the hoes will be permitted to rise against the tension of a spring 69 which is interposed between a lip 70 on the control lever 44 and a projection 71 extending laterally from one of the arms 40, a second lip 72 formed on the control lever 44 limiting the extent of downward movement of the hoes.

For protecting the plants under cultivation two side guards 73 are provided between which the row of vegetation 74 is received. These side guards 73 are adjustably mounted on a rod 75 which in turn is secured to a bracket 76 mounted on the central frame member 35.

By means of this arrangement the ground treated is finely pulverized or mulched, leaving the soil in a finely divided state, forming a loose, soft, level blanket which readily absorbs moisture and transmits it to the subsoil in which the roots of the plants being cultivated are located. The weeds which are in the path of the hoes are cut and otherwise destroyed as a result of the earth or soil being entirely separated or knocked from their roots. The soil is cultivated to a uniform depth whereby the same soil is mulched each time the ground is treated. The seed bed below the treated depth of soil is not disturbed in any manner whatsoever, and accordingly, is not directly exposed to the heat of the sun. The hoes can cultivate much closer to the plants than heretofore has been possible, and without damage to the roots of the plants. The hoes in this arrangement leave no furrows to carry off the water or to expose the seed bed to the heat of the sun to evaporate or absorb the moisture out of the seed bed. By increasing or decreasing the speed of operation of the hoes the ground may be cultivated or pulverized to any desired extent.

It will be noted that the cutting stroke of the hoes, which is rearward of the machine, has a tendency to advance the tractor, thereby reducing the power required to propel the tractor to a minimum.

In connection with the quick and accurate guiding of the tractor to prevent injury to the plants, it will be noted that the front of the tractor is provided with a pair of guide wheels 77, the steering knuckles or vertical pivotal pins 78 of which are in advance of points at which the guiding wheels 77 engage the ground, so that when the operator, who sits on the seat 79, turns the wheels to the right or left through the control handle 80, he steers said guiding wheels one way or the other, the tractor as a whole promptly responding in the same direction. Accordingly, even though plants are in a rather irregular row, the ground around said plants may be mulched or pulverized without any danger whatsoever to the plants, it being a simple matter through the guiding means here described, to steer the tractor in such a manner that the plants at all times will be maintained between the protecting side guards 73.

It is my intention to cover all modifications of the invention falling within the spirit and scope of the following claims.

I claim:

1. In ground cultivating mechanism, the combination of a ground working tool, an arm to which said tool is connected, a crank shaft operatively connected to said arm for actuating said tool, means for varying the height of said crank shaft, and means for yieldably supporting the crank shaft whereby if the ground working tool encounters an impenetrable substance the tool and associated parts will not be damaged.

2. In ground cultivating mechanism, the combination of a ground working tool, an arm to which said tool is secured, a crank shaft operatively connected to said arm for actuating said tool, means for supporting said crank shaft, means for varying the height of said supporting means, and means associated with said supporting means and said arm for controlling the stroke of said ground working tool.

3. In ground cultivating mechanism, the combination of a ground working tool, an arm to which said tool is secured, a crank shaft operatively connected to said arm for actuating said tool, means for supporting said crank shaft, means associated with said supporting means and said arm for controlling the stroke of said ground working tool, and means for varying the vertical position of said crank shaft, control means and ground working tool with respect to the ground to control the amount of ground the tool penetrates.

4. In a power propelled implement, a frame, a motor mounted on said frame, a ground working tool, a crank shaft through which said ground working tool is given a ground slicing action for mulching the soil, means whereby said crank shaft is driven from said motor, and means for changing the position of said crank shaft for changing the driving relationship between said motor and said tool.

Signed at Port Washington, Wisconsin, this 26th day of September, 1921.

GEORGE T. STRITE.